United States Patent [19]
Tanaka

[11] Patent Number: 5,448,656
[45] Date of Patent: Sep. 5, 1995

[54] BINARY IMAGE PROCESSING APPARATUS

[75] Inventor: Yuji Tanaka, Yamatokoiyama, Japan

[73] Assignee: Sharp Kabushiki Kaisha, Osaka, Japan

[21] Appl. No.: 859,857

[22] Filed: Mar. 30, 1992

Related U.S. Application Data

[62] Division of Ser. No. 599,429, Oct. 18, 1990, abandoned.

[30] Foreign Application Priority Data

Oct. 23, 1989 [JP] Japan ................................. 1-275600
Oct. 23, 1989 [JP] Japan ................................. 1-275601

[51] Int. Cl.$^6$ ............................................. G06K 9/00
[52] U.S. Cl. ................................. 382/252; 358/455
[58] Field of Search ............... 382/54, 52, 50, 56; 358/456, 455, 457, 466, 75, 80, 458

[56] References Cited

U.S. PATENT DOCUMENTS

| | | | |
|---|---|---|---|
| 4,084,196 | 4/1978 | Tisue et al. | 358/283 |
| 4,291,339 | 9/1981 | Ogawa et al. | 358/260 |
| 4,319,268 | 3/1982 | Yamada | 358/75 |
| 4,326,258 | 4/1982 | de la Guardia | 364/515 |
| 4,907,841 | 3/1990 | Shimoni | 382/54 |
| 4,924,322 | 5/1990 | Kurosawa et al. | 358/448 |
| 4,953,013 | 8/1990 | Tsuji et al. | 358/75 |
| 4,975,786 | 12/1990 | Katayama et al. | 358/466 |
| 5,008,950 | 4/1991 | Katayama et al. | 382/50 |
| 5,051,844 | 9/1991 | Sullivan | 358/456 |

FOREIGN PATENT DOCUMENTS 0070161 1/1983 European Pat. Off. .
3838730 5/1989 Germany .

OTHER PUBLICATIONS

IBM Technical Disclosure Bulletin, vol. 21, No. 7, Dec. 1978, pp. 3001–3003—K. Y. Wong, "Multi-function auto thresholding algorithm".

Primary Examiner—Leo H. Boudreau
Attorney, Agent, or Firm—Nixon & Vanderhye

[57] ABSTRACT

A binary image processing apparatus is provided which is capable of clearly and stably performing binary encoding of an image signal having a level corresponding to the density of each inputted pixel even when the difference in density between characters and background is small. Such apparatus includes a first level discriminating device which has a first input terminal for receiving an image signal having a level corresponding to the density of a pixel of the image signal and a second input terminal for receiving a signal indicative of a discrimination level so as to discriminate the level of the image signal by the discrimination level into binary data. A differential device obtains a differential value of the image signal at the pixel and a second level discriminating device discriminates the level of the differential value by a predetermined discrimination level. In response to image signals in the vicinity of the pixel, a calculating device determines an average value of density levels in the vicinity of the pixel and a discrimination level changing device supplies the average value to the second input terminal of the first level discriminating device but retains the discrimination level inputted to the second input terminal of the first level discriminating device when the differential value exceeds and is not more than the predetermined discrimination level.

5 Claims, 15 Drawing Sheets

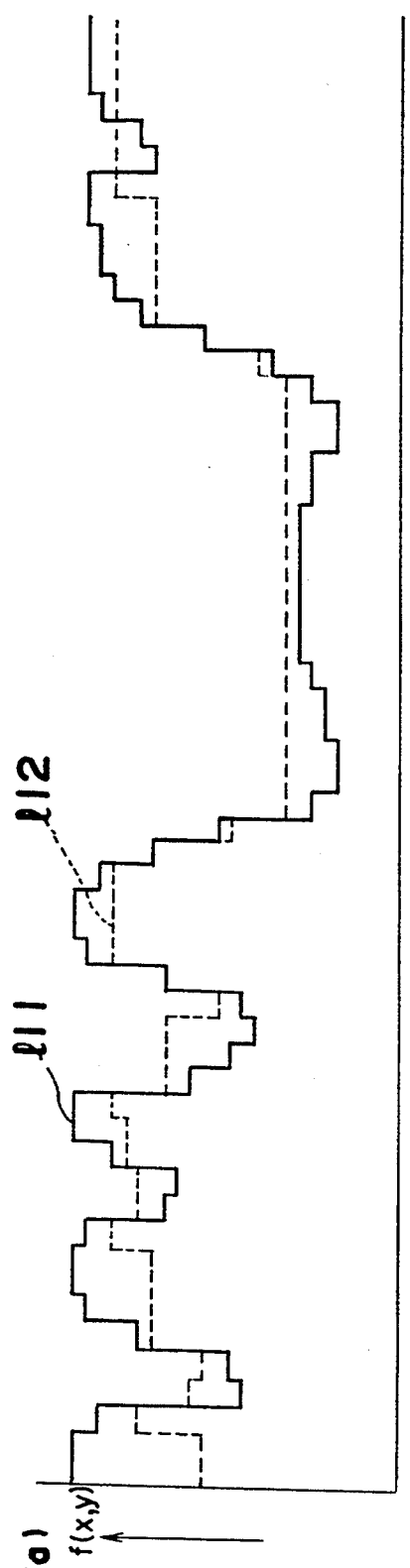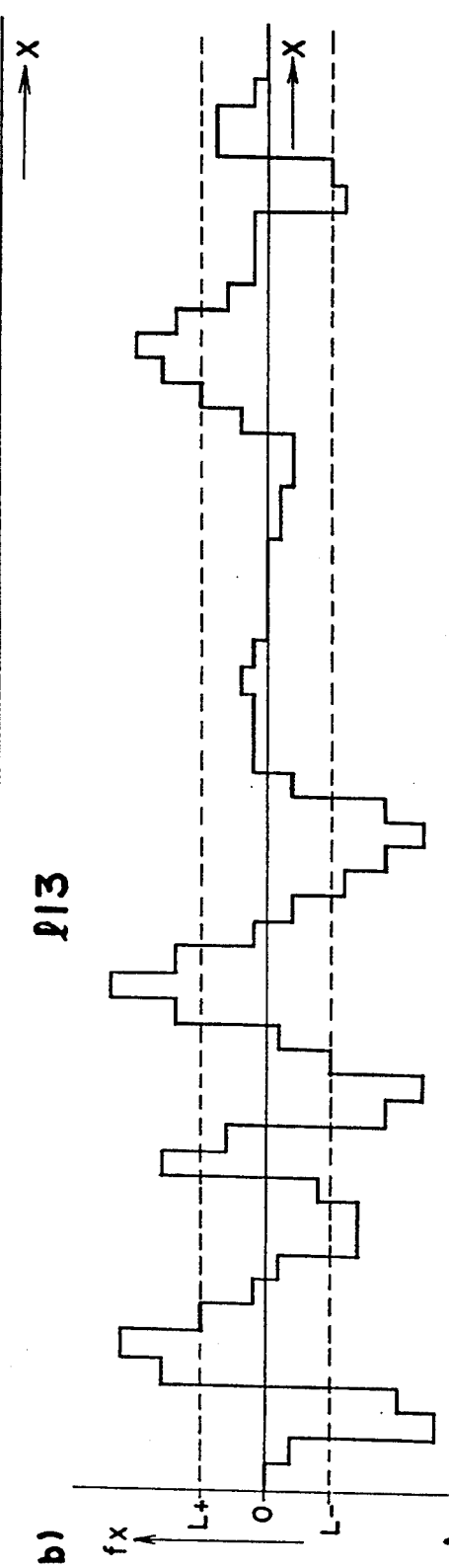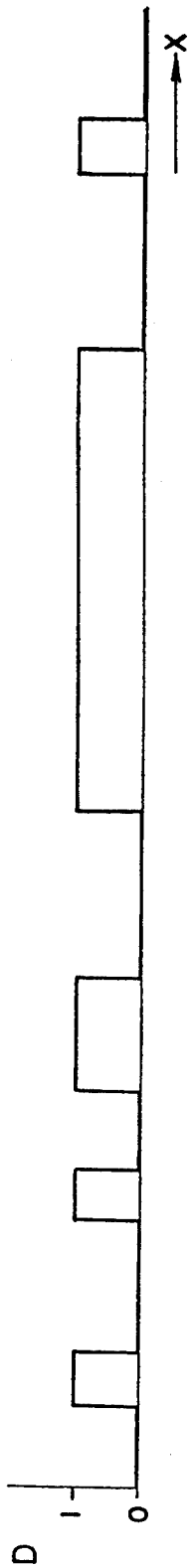
Fig. 10(a)
Fig. 10(b)
Fig. 10(c)

BINARY IMAGE PROCESSING APPARATUS

This is a division of application Ser. No. 07/599,429, filed Oct. 18, 1990, now abandoned.

BACKGROUND OF THE INVENTION

The present invention relates to a binary image processing apparatus which is suitable for use in an image reader employed in a facsimile machine or the like so as to display with black and white pixels, image data read by the image reader.

Conventionally, a facsimile machine or the like is provided with a binary image processing apparatus for outputting an image of an original document per predetermined pixel unit as binary signals representative of black and white pixels in accordance with density of the pixel unit. In the known binary image processing apparatus, the image face of the original document is scanned by a reading sensor formed by, for example, a charge coupled device (CCD) and an image signal having a level corresponding to density of the image of the original document per predetermined pixel unit is generated from the image of the original document. Then, binary image processing is performed such that the level of the image signal is discriminated into binary data corresponding to the black and white pixels, on the basis of a discrimination level set in accordance with density of the image of the original document.

In typical known binary image processing, average density slice method is employed as shown in FIG. 1. In this method, an average density AVE of pixels of a relatively wide area of, for example, 3 scanning lines×16 pixels is calculated by disposing a specific target pixel at a center of the area. When level of an image signal S of the target pixel is lower than the average density AVE by a predetermined value AVA or more, it is judged that the pixels are black pixels. Otherwise, it is judged that the pixels are white pixels. Namely, the image signal S obtained from the CCD or the like is based on quantity of light reflected from the face of the original document. Thus, as level of the image signal S becomes lower, the corresponding pixel is darker. On the contrary, as level of the image signal S becomes higher, the corresponding pixel is lighter.

As shown in FIG. 1, in average density slice method, a boundary line 11 is provided for discriminating an area of the black pixels and an area of the white pixels from each other. When the level of the image signal S is smaller than a minimum Smin, it is forcibly decided by the boundary line 11 that the pixels are black pixels regardless of the average density AVE. On the other hand, when the level of the image signal S is larger than a maximum Smax, it is forcibly decided by the boundary line 11 that the pixels are white pixels. Furthermore, when the level of the image signal S is disposed between the maximum Smax and the minimum Smin and is smaller than the average density AVE, it is decided that the pixels are black pixels forming a portion of characters.

In FIG. 1, the boundary line 11 is set lower by the predetermined value AVA than a line 12 which is proportional to the average density AVE and passes through an origin O. This is because in the case where an image of characters or signs recorded in black on, e.g., a grey background of the face of the original document is read, gradation of the binary data obtained by binary encoding is shifted to the white side such that noises are eliminated.

In the above described average density slice method, in order to obtain the average density AVE having the target pixel as the center of the area, average operation of the relatively wide area of, for example, 3 scanning lines×16 pixels is required to be performed. Thus, a line buffer memory for temporarily storing the image signal needs a large capacity, thereby resulting in rise of its production cost.

In FIG. 2(a), a solid line 13 represents changes of the image signal S on the scanning line and a broken line 14 represents changes of the average density AVE. Meanwhile, a one-dot chain line 15 represents changes of a threshold level Sh obtained by subtracting the predetermined value AVA from the average density AVE, i.e. Sh=AVE−AVA.

FIG. 2(b) shows results of binary encoding of the prior art average density slice method. Meanwhile, FIG. 2(c) shows results of desirable binary encoding. As will be seen from FIGS. 2(a) to 2(c), when an image of a thin line is subjected to binary encoding, the following problems will arise. Namely, in the case where a width of the line is smaller than a width of a single unitary reading pixel or density changes partially along the line with respect to the average density AVE calculated from the image signal S oriented in the direction along the line, obtained level of the image signal S does not become sufficiently small. Meanwhile, when changes of level of the image signal S are greater than changes of the average density AVE, the thin continuous solid line is displayed as a broken line formed by a plurality of thin lines in the binary image obtained by binary encoding, so that a portion of the line is erased undesirably.

Furthermore, FIG. 3 shows a prior art binary image processing apparatus. The image signal S is sequentially outputted for each pixel from the CCD or the like and is subjected to analog-digital conversion. Then, the image signal S is supplied to a line buffer 1 and the image signal S stored in the line buffer 1 is fed to another line buffer 2. The line buffers 1 and 2 have storage capacities corresponding to scanning lines of the image face of the original document, respectively. Based on the image signals stored in the line buffers 1 and 2 and the image signal S, binary data D is outputted for each pixel from a binary circuit 3. The binary data D is stored in a line buffer 4. Based on the binary data D and the binary data stored in the line buffer 4, a binary data correcting circuit 5 yields a binary output.

Conventionally, when an image of intermediate gradation is subjected to binary encoding, error diffusion method is employed in which after an error E obtained from binary data of vertically and laterally neighboring pixels of a specific target pixel, for example, 4 peripheral pixels of the target pixel have been added to the image signal S of the target pixel, binary encoding is performed. FIG. 4 shows a known circuit for implementing error diffusion method. The image signal for each pixel is supplied to an adder 6. The adder 6 also receives an error signal E to be described below. An additive signal Se obtained by adding the error signal E to the image signal S is fed to a comparator 7. On the basis of a threshold value Sh from a threshold setting circuit 8, the comparator 7 discriminates level of the additive signal Se so as to output the binary data D of the image signal S.

Thereafter, the binary data D is supplied to an error calculator 9. The error calculator 9 also receives the image signal S so as to calculate an error e of the pixel corresponding to the image signal S. Namely, when the binary data from the comparator 7 is 1, the error calculator 9 sets the error e at S. On the other hand, when the binary data from the comparator 7 is 0, the error calculator 9 sets the error e at (S−R) where character R denotes a constant.

The error e from the error calculator 9 not only is supplied, as an error eD, to a line buffer 11 through a delay of one pixel by a delay circuit 10 but is applied to a multiplier 12. The line buffer 11 has a storage capacity which is smaller than the number of pixels of one scanning line by two pixels. Assuming that each pixel has the error e as shown in FIG. 15(c), the error eD is supplied from the delay circuit 10 to the line buffer 11 and an error eA is outputted from the line buffer 11. The output eA from the line buffer 11 is changed to an error eB by a delay circuit 13 and the error eB is, in turn, changed to an error eC by a delay circuit 14. The errors eB and eC are applied to the multiplier 12.

The multiplier 12 supplies to an adder 15, values obtained by multiplying weighting factor k1, k2, k3 and k4 to the errors eA, eB, eC and eD, respectively. The adder 15 outputs, as an error signal E, a sum of these values. Namely, the error signal E is given by the following equation.

$$E = k_1 \cdot eA + k_2 \cdot eB\ 30\ k_3 \cdot eC + k_4 \cdot eD$$

The circuit of FIG. 4 for implementing error diffusion method is usually obtained by adding the components to the circuit of FIG. 3. Therefore, in such known binary image processing apparatus, the line buffer 11 for storing the error e shown in FIG. 4 is required to be provided in addition to the line buffers 1 and 2 for temporarily storing the inputted image signal S and the line buffer 4 for storing the binary data D.

SUMMARY OF THE INVENTION

Accordingly, an essential object of the present invention is to provide a binary image processing apparatus which is capable of clearly and stably performing binary encoding of an image signal having level corresponding to density of each inputted pixel even when difference in density between characters and background is small.

Another important object of the present invention is to provide a binary image processing apparatus which is capable of performing binary encoding of the image signal by error diffusion method without the need for additionally providing storage means such as a line buffer memory.

In order to accomplish the objects of the present invention, a binary image processing apparatus according to a first embodiment of the present invention comprises: a first level discriminating means which has a first input terminal for receiving an image signal having a level corresponding to density of a pixel of the image signal and a second input terminal for receiving a signal indicative of a discrimination level so as to discriminate level of the image signal by the discrimination level into binary data; a differential means for obtaining a differential value of the image signal at the pixel; a second level discriminating means for discriminating level of the differential value by a predetermined discrimination level; a calculating means for calculating, in response to image signals in the vicinity of the pixel, an average value of density levels in the vicinity of the pixel; and a discrimination level changing means which supplies the average value to the second input terminal of said first level discriminating means and retains the discrimination level inputted to the second input terminal of said first level discriminating means when the differential value exceeds and is not more than the predetermined discrimination level, respectively.

In accordance with the present invention, the image signal has level of density of the pixel so as to be inputted to the first input terminal of the first level discriminating means such that the first level discriminating means discriminates, by using the signal inputted to the second input terminal and indicative of the discrimination level, the image signal into the binary data.

The differential value of the inputted image signal is obtained by the differential means and is subjected to level discrimination in the second level discriminating means by using the predetermined discrimination level. Meanwhile, the image signals in the vicinity of the pixel to be subjected to binary encoding by the first level discriminating means are supplied to the average value calculating means in which the average value of the density levels in the vicinity of the pixel is obtained.

This average value is supplied by the discrimination level changing means. Namely, when the differential value outputted from the second level discriminating means exceeds the predetermined discrimination level, the average value is supplied to the second input terminal of the first level discriminating means by the discrimination level changing means so as to be set as the discrimination level. On the other hand, when the differential value is not more than the predetermined discrimination level, the discrimination level which has been supplied from the average value calculating means to the discrimination level changing means up to an immediately prior time point is retained so as to be supplied, as the discrimination level, to the second input terminal of the first level discriminating means.

As described above, the discrimination level which is supplied to the second input terminal of the first level discriminating means is changed to the average value of the density levels in the vicinity of the pixel only when the differential value of the image signal at the pixel exceeds the predetermined discrimination level. Therefore, only in the area in which density changes greatly as in the case of peripheral portions of characters and signs, the discrimination level of the first level discriminating means for performing binary encoding is changed. In this case, after the peripheral portions of the characters, etc. have been detected, the discrimination level of the first level discriminating means does not readily change. Accordingly, even when an image of an original document is a thin character in white background, a black character in gray background or a white character in black background, a boundary between the character and its background is clearly displayed through stable binary encoding of the character.

BRIEF DESCRIPTION OF THE DRAWINGS

These objects and features of the present invention will become apparent from the following description taken in conjunction with the preferred embodiments thereof with reference to the accompanying drawings, in which:

FIGS. 10(a) to 10(c) are graphs showing results of binary encoding of the image processing circuit of FIG. 9;

Before the description of the present invention proceeds, it is to be noted that like parts are designated by like reference numerals throughout several views of the accompanying drawings.

DETAILED DESCRIPTION OF THE INVENTION

Figure 5:
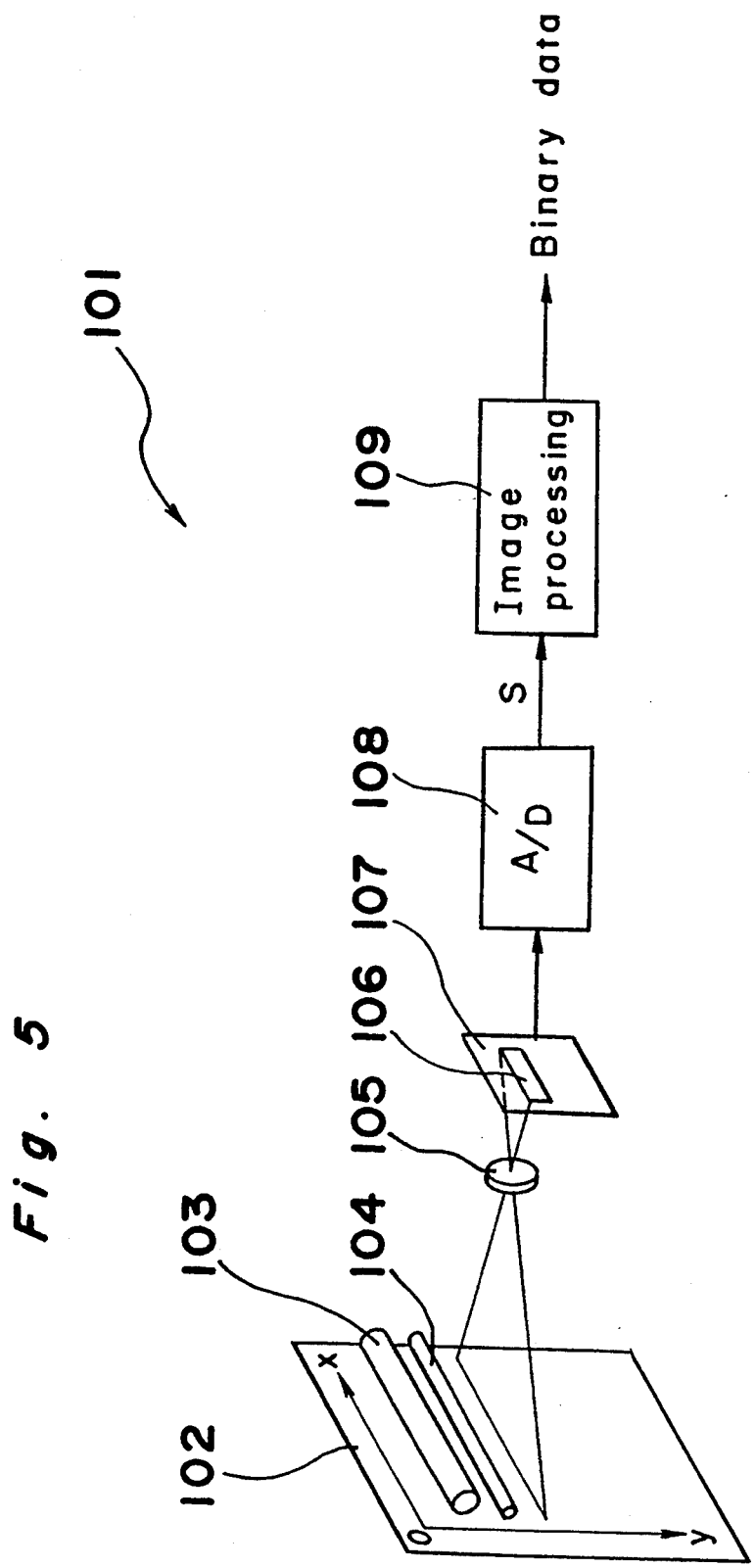
FIG. 5 is a schematic block diagram of a binary image processing apparatus according to a first embodiment of the present invention.

Referring now to the drawings, there is shown in FIG. 5, a binary image processing apparatus 101 according to a first embodiment of the present invention. Light from a light source 103 such as a fluorescent lamp is irradiated onto an image of an original document 102. Then, reflected light from the original document 102 is read through a lens 105 by a solid pickup element 106 of a reading sensor 107 so as to be supplied, as an analog image signal corresponding to the image of the original document 102, to an analog-digital converter 108. The solid pickup element 106 is formed by, for example, a CCD (charge coupled device). The analog image signal is converted into a digital image signal S by the analog-digital converter 108 and the digital image signal S is fed to an image processing circuit 109.

The image processing circuit 109 is formed by, for example, a microcomputer. After performing shading correction of characteristics of an optical system including the lens 105 or the pickup element 106, the image processing circuit 109 performs, based on the the digital image signal S, binary encoding corresponding to density of each pixel so as to output binary data.

Hereinbelow, a fundamental configuration for implementing the present invention is described in the case of a one-dimensional linear image. It is assumed here that character x denotes position of the linear image, characters f(x) denote density of the linear image, characters f'(x) denote linear differential of the density f(x) with respect to the position x and characters AVE(x) denote average density of the linear image in the vicinity of the position x. Then, binary encoding from the density f(x) of the linear image to binary data D is performed by the following equation (1).

$$\left. \begin{array}{l} \text{If } f(x) < Sh, \text{ then: } D(x) = 1 \text{(Black pixel)} \\ \text{If } f(x) \geq Sh, \text{ then: } D(x) = 0 \text{(White pixel)} \end{array} \right\} \quad (1)$$

In the equation (1), characters Sh denote a threshold level in binary encoding and the threshold level Sh is set by the following equation (2).

$$\left. \begin{array}{l} \text{If } f'(x) < L_- \text{ or } L_+ < f'(x), \text{ then: } Sh = AVE(x) \\ \text{If } L_- \leq f'(x) \leq L_+, \text{ then: } Sh = \text{immediately prior value} \end{array} \right\} \quad (2)$$

In the equation (2), characters $L_+$ and $L_-$ are constants satisfying the following equation.

$L_- < 0 < L_+$

The constants $L_+$ and $L_-$ are properly set on the basis of the binary data obtained from binary encoding performed by the equations (1) and (2).

Figure 6:
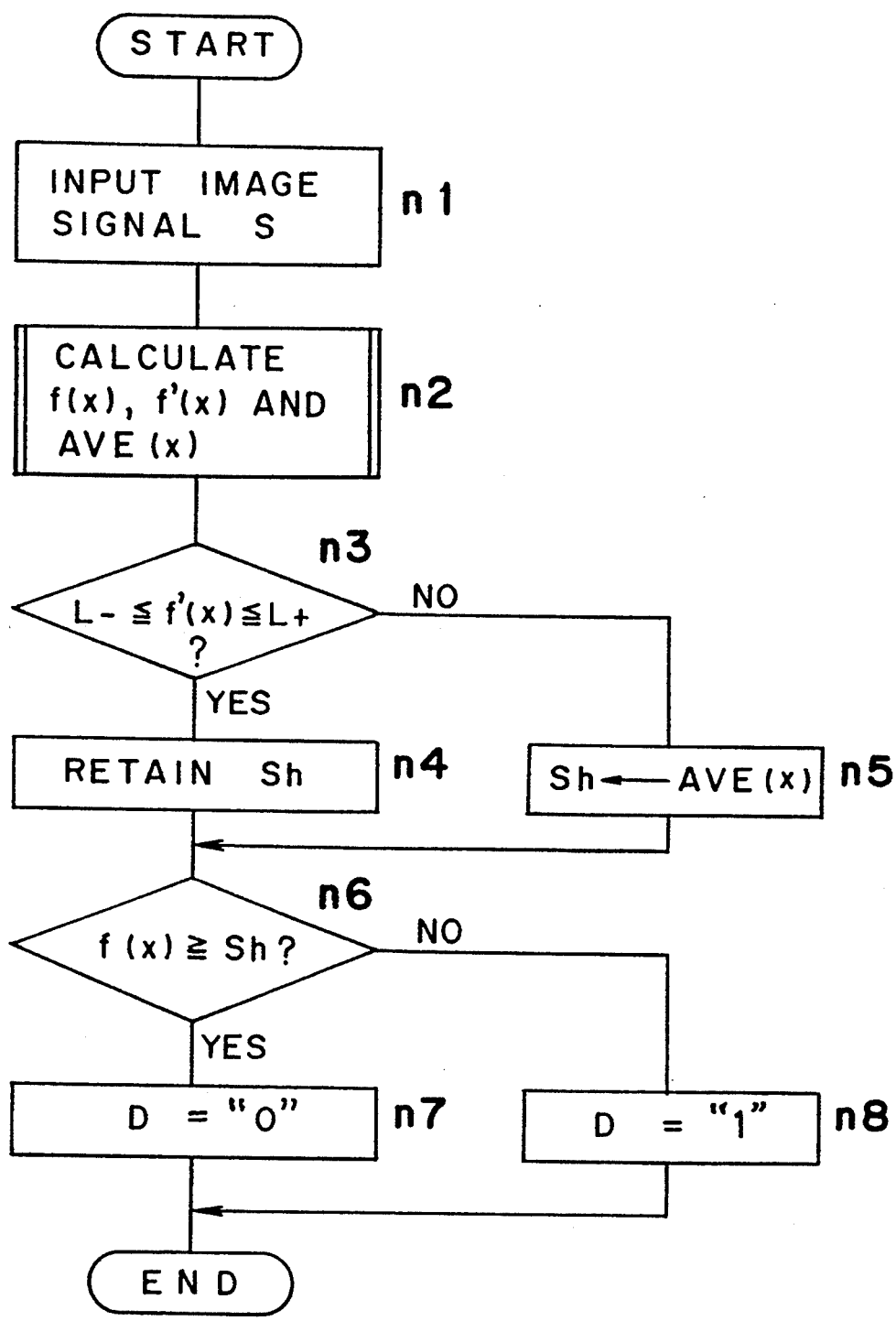
FIG. 6 is a flowchart showing sequences of binary encoding in the binary image processing apparatus of FIG. 5.

FIG. 6 shows sequences of image processing of the binary image processing apparatus 101 in accordance with the above described fundamental configuration. When the digital image signal S representative of gradation data after analog-digital conversion has been inputted to the image processing circuit 109, the image processing circuit 109 stores the digital image signal S in a memory (not shown) at step n1. Then, at step n2, the density f(x), the change f'(x) of the density f(x) and the average density AVE(x) are calculated from the digital image signal S on the basis of predetermined operational equations, respectively.

Subsequently, at step n3, it is judged whether or not the change f'(x) of the density f(x) is equal to the constant $L_-$ or $L_+$ or falls between the constants $L_-$ and $L_+$. In the case of "YES" at step n3, the program flow proceeds to step n4 at which the threshold value Sh of binary encoding retains the threshold value Sh used in the immediately prior binary encoding. Step n4 is followed by step n6.

On the other hand, in the case of "NO" at step n3, the average density AVE(x) of the target position x obtained at step n2 is set at the threshold value Sh at step n5 followed by step n6. At step n6, level of the density f(x) of the image is discriminated by the threshold value Sh set at step n4 or step n5. Namely, if the density f(x) of the image is not less than the threshold value Sh, program flow proceeds to step n7 at which the binary output D of 0 at the position x is outputted. Meanwhile, if the density f(x) of the image is smaller than the threshold value Sh, the binary output D of 1 is outputted at step n8.

FIGS. 7(a) to 7(d) show results of binary encoding of the density f'(x) of the one-dimensional linear image in the binary image processing apparatus 101, which binary encoding is based on the above equations (1) and (2). In this embodiment, by discriminating the change f'(x) of the density f(x) based on the constants $L_+$ and $L_-$ acting as the discrimination levels, the position x at which the density f(x) changes sharply is judged as a peripheral portion of a character in the image. At this time, only when the change f'(x) of the density f(x) is so large as to exceed the constant $L_+$ or is so small as to be smaller than the constant $L_-$, the threshold level Sh in binary encoding is set at the average density AVE(x) of periphery of the position x corresponding to the specific target pixel selected for binary encoding. Meanwhile, when the change f'(x) of the density f(x) falls within a region ranging from the constant $L_-$ to the constant $L_+$, the threshold level Sh is set at an average density AVE(xin) at a boundary position xin located immediately prior to entry of the position x into the above mentioned region along the scanning direction. Meanwhile, an initial value of the threshold level Sh may be properly set at, for example, an intermediate value between a maximum and a minimum of the density f(x).

As described above, if absolute value of the change f'(x) of the density f(x) falls within the range bounded by the constants $L_+$ and $L_-$, the threshold level Sh is maintained at the fixed value without being changed. Accordingly, even if the image of the original document 102 is a white light character, a black character in grey background or a white character in black background, the binary data obtained after binary encoding is capable of displaying boundary between the character and background vividly. Meanwhile, even if density of the image changes along a direction of a thin line, the image is not judged as periphery of the character so far as the change f'(x) of the density f(x) falls within the range bounded by the constants $L_+$ and $L_-$, so that it becomes possible to stably perform binary image processing and thus, a high-quality image can be obtained in the binary image processing apparatus 101.

Hereinbelow, two-dimensional binary encoding in which the image of the sheetlike original document 102 as shown in FIG. 5 is read by scanning the face of the original document 102 is described in place of the above described binary encoding of the density of the one-dimensional image. At this time, an x-y coordinate system is set on the face of the original document 102 as shown in FIG. 5 and a linear differential fxy(x, y) of a function f(x, y) of density of the image of the original document is given by the following equation (3).

$$fxy(x, y) = \sqrt{\{df(x, y)/dx\}^2 + \{df(x, y)/dy\}^2} \qquad (3)$$

However, it is difficult to obtain the linear differential f'(x) in the case of the above described one-dimensional image by the image signal from the pickup element 106 of the reading sensor 107, for example, the CCD. Furthermore, calculation of the linear differential fxy(x, y) in the case of the two-dimensional image from the above equation (3) is not only difficult but offers problems such as drop of processing speed and rise of the production cost in, especially, an image scanner or the like.

Figure 8:
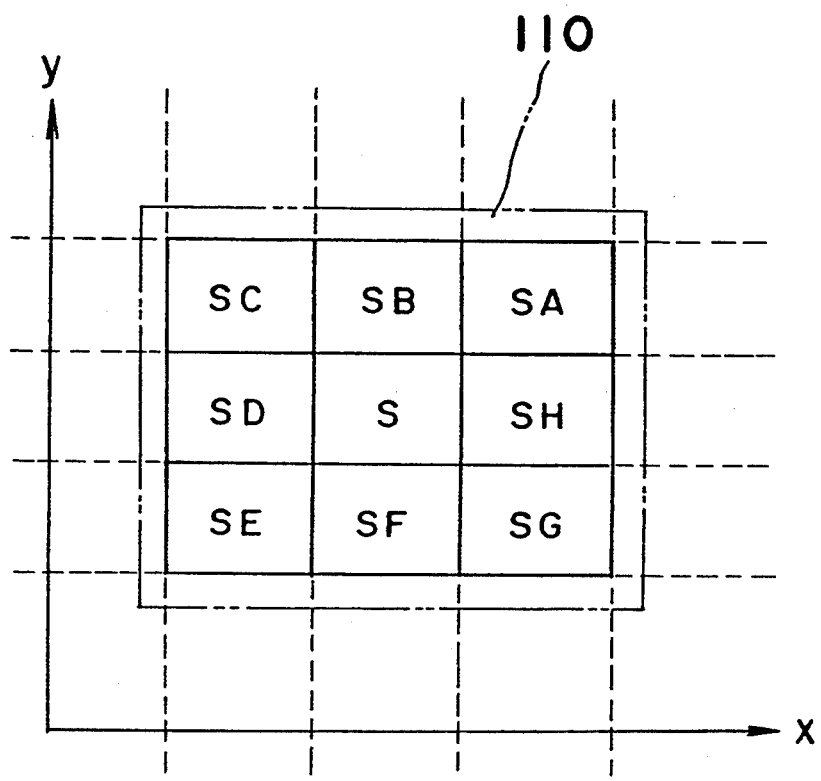
FIG. 8 is a view showing a target pixel and its target region in a two-dimensional image in the binary image processing apparatus of FIG. 5.

Thus, as shown in FIG. 8, a target region 110 of neighboring 3×3 pixels having a target pixel disposed at its center is set. From image signals SA to SH of the pixels forming the target region 110, the linear differentials df/dx and df/dy which are changes of density of the image in the directions of the x-axis and the y-axis, respectively are approximated by using the image signals SD and SH adjoining the target pixel laterally and the image signals SB and SF adjoining the target pixel vertically, respectively as shown in the following equation (4).

$$\left. \begin{array}{l} df(x, y)/dx \approx SH - SD = fx \\ df(x, y)/dy \approx SF - SB = fy \end{array} \right\} \qquad (4)$$

Regarding the density changes fx and fy given by the equation (4), the threshold level Sh in binary encoding is set by the following equation (5).

If $fx < L_-$ or $fy < L_-$ or $L_+ < fx$ or $L_+ < fy$, then: (5)
$Sh = AVE(x, y)$
If $L_- \leq fx \leq L_+$ and $L_- \leq fy \leq L_+$, then:
$Sh = $ immediately prior value In the equation (5), characters $L_+$ and $L_-$ are constants satisfying the following equation.

$L_- > 0 > L_+$

Furthermore, in the equation (5), characters AVE(x, y) denotes average density of periphery of the target pixel and is given by the following equation (6).

$$AVE(x, y) = (SA+SB+SC+SD+SE+SF+SG+SH)/8 \qquad (6)$$

Assuming that character D denotes a binary output, binary encoding of the digital image signal S corresponding to the target pixel is performed as follows by using the threshold value Sh determined by the equation (5).

$$\left. \begin{array}{l} \text{If } S < Sh, \text{ then: } D = 1(\text{Black pixel}) \\ \text{If } S \geq Sh, \text{ then: } D = 0(\text{White pixel}) \end{array} \right\} \qquad (7)$$

Figure 9:
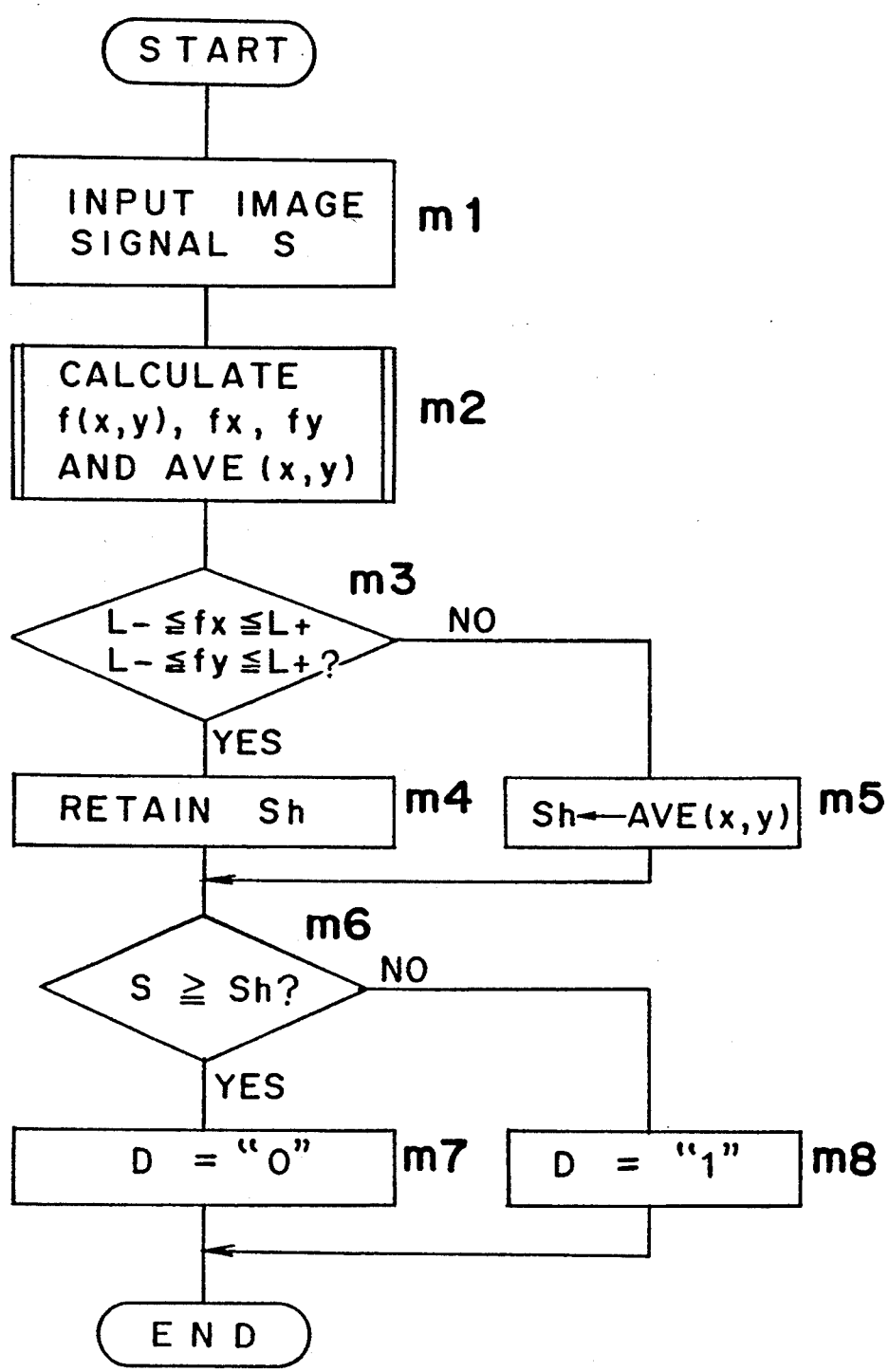
FIG. 9 is a flowchart showing operational sequences of an image processing circuit employed in the binary image processing apparatus of FIG. 5.

FIG. 9 shows sequences of binary encoding of the above described two-dimensional image in the binary image processing apparatus 101. Initially, at step m1, the digital image signal S is inputted. At step m2, the density f(x, y) of the pixel corresponding to the coordinates (x, y), the changes fx and fy of the density of the target region 110 including the pixel having the coordinates (x, y) and the average density AVE(x, y) of the target region 10 are calculated based on the inputted digital image signal S, the equation (4) and the equation (6), respectively. At step m3, it is judged whether or not the changes fx and fy of the density of the target region 110, which were calculated at step m2, satisfy the equation (5). In the case of "YES" at step m3, the program flow proceeds to step m4 at which the threshold value Sh in binary encoding retains the threshold value Sh used in the immediately prior binary encoding of the image. Step m4 is followed by step m6.

On the other hand, in the case of "NO" at step m3, the average density AVE(x, y) of the target region 110 given by the equation (6) is set as the threshold value Sh at step m5 followed by step m6. At step m6, the digital image signal S of the pixel corresponding to the density f(x, y) is discriminated by using the threshold value Sh as the discrimination levels set at steps m4 and m5. In the case of "YES" at step m6, the binary output D of 0 is generated at step m7. On the contrary, in the case of "NO" at step m6, the binary output D of 1 is generated at step m8.

FIGS. 10(a) to 10(c) show results of the above described binary encoding of the two-dimensional image having the density f(x) of FIGS. 7(a) to 7(d) in the direction of the x-axis as one scanning line. In FIG. 10(a), changes of the density f(x) shown by a solid line 111 represent gradation data of each pixel of the solid line 16 indicative of changes of the density f(x) shown in FIGS. 7(a) to 7(d). A broken line 112 indicates gradation data of a one-dot chain line 110 showing the threshold value Sh in FIG. 7(c). Meanwhile, in FIG. 10(b), a solid line 113 indicates operational results of a solid line 17 based on the above equation (4), which solid line 17 represents the density change f'(x) in FIG. 7(b). Therefore, the binary output D shown in FIG. 10(c) corresponds to the binary output D shown in FIG. 6(d).

Figure 7A:
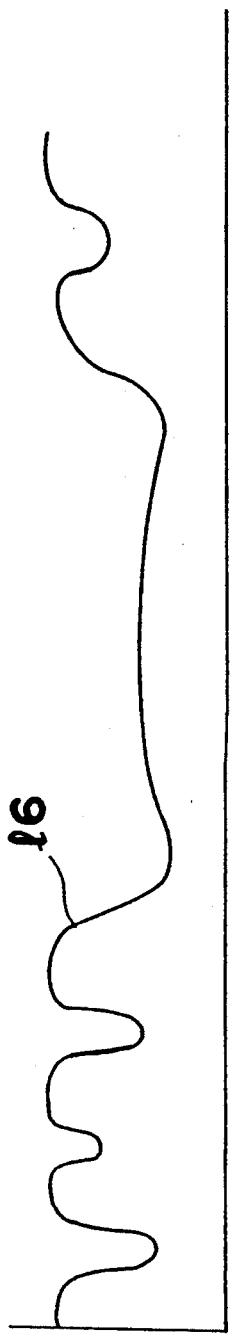
FIGS. 7(a) to 7(d) are graphs showing results of binary encoding of FIG. 6.
Figure 7B:
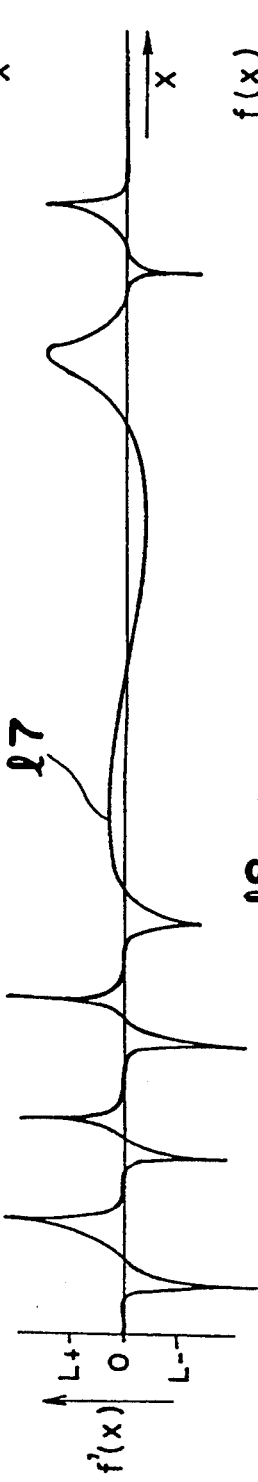
Figure 7C:
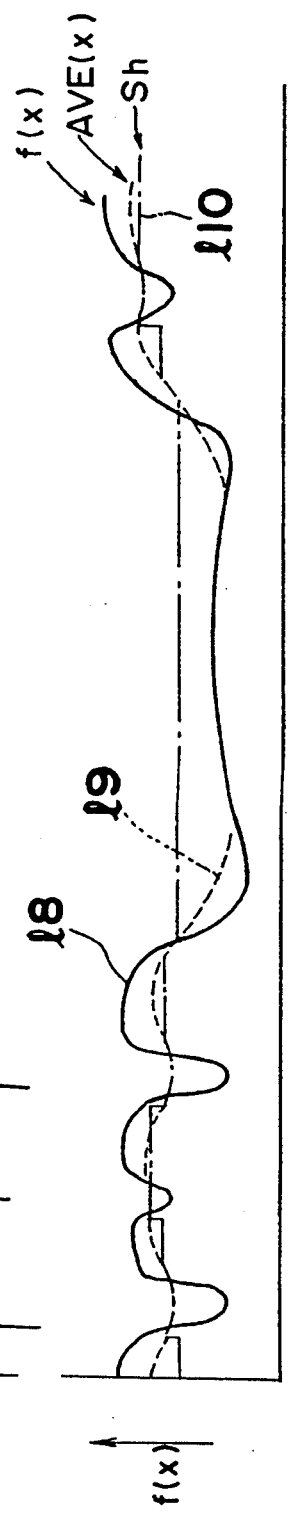
Figure 7D:
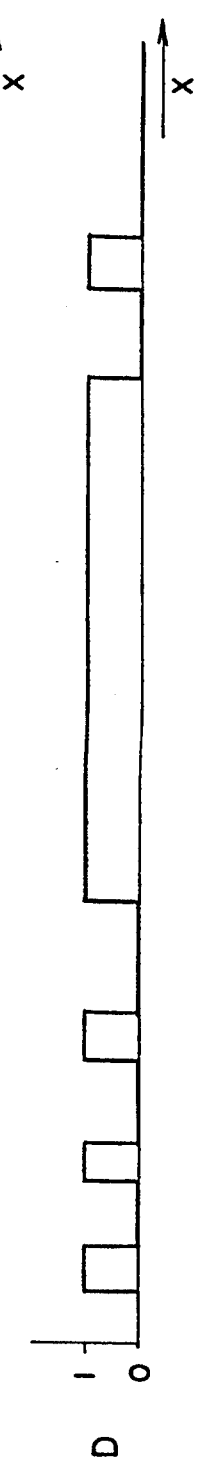

As will be seen from comparison between FIG. 10(c) and FIG. 7(d), even if the threshold value Sh in binary encoding based on the equations (4) to (6) is set for the target region having the target pixel as its center as shown in FIG. 8, it is possible to sufficiently accurately detect the boundary area between white pixels and black pixels in the image. Meanwhile, for example, even if a character larger than the region for obtaining the average density exists, the portion of the character is judged as black pixels once the boundary area between background and the character has been detected and unless the density changes sharply subsequently. Thus, omission of the black portion does not take place. The same effects as described above can be achieved also in the case of a white character in black background.

In the above described embodiment, the threshold value Sh in binary encoding is so set as to fall in a permissible range bounded by the upper and lower limits. Thus, when the density of the image is not less than the threshold value Sh, it is judged that the pixel is a white pixel. On the contrary, when the density of the image is smaller than the threshold value Sh, it is judged that the pixel is a black pixel. As a result, it becomes possible to eliminate unnecessary patterns of background of a character or noises.

Meanwhile, as shown in the equation (4), deviation between the image signals of the pixels adjoining the target pixel laterally and deviation between the image signals of the pixels adjoining the target pixel vertically are, respectively, regarded as change of the density in the direction of the x-axis and change of the density in the direction of the y-axis. Therefore, identical binary encoding is performed when change of the density of the image ascends and descends symmetrically with respect to the scanning direction of the x-axis in the reading sensor 107. Since difference between the image signals of the neighboring pixels of the target pixel interposed therebetween in the direction of the x-axis and difference between the image signals of the neighboring pixels of the target pixel interposed therebetween in the direction of the y-axis are obtained as described above, changes of the density obtained from the equation (4) become large. Accordingly, such an effect can be achieved that the boundary area between the character and its background can be detected more easily.

In the above embodiment, changes of the density in the directions of the x-axis and the y-axis are, respectively, obtained from the digital image signals SD and SH of the pixels adjoining the target pixel laterally and the digital image signals SB and SF of the pixels adjoining the target pixel vertically. However, to this end, the digital image signals SA and SE of the pixels adjoining the target pixel obliquely and the digital image signals SC and SG of the pixels adjoining the target pixel obliquely may also be employed in addition to the above mentioned image signals SB, SD, SF and SH.

Meanwhile, in order to calculate the average density in this embodiment, the equation (6) is used in which arithmetical mean of the digital image signals SA to SH is taken simply. However, the present invention is not restricted to this procedure. Namely, it can also be so arranged that after the digital image signals SA to SH have been weighted, mean of the weighted digital image signals SA to SH is taken. Furthermore, in place of the eight neighboring pixels of the target pixel, a wider target region than the 3×3 pixels may be set such that average density of the target region is taken.

As will be seen from the foregoing, in this embodiment, average density at the target pixel is obtained from the relatively narrow target region of the neighboring pixels of the target pixel. Thus, the line buffer memory used for obtaining average density of the target pixel may have a small storage capacity, thereby resulting in reduction of the production cost. Meanwhile, in this embodiment, the threshold value in binary encoding is so set as to vary in accordance with the average density in only the region where the density changes greatly. Therefore, even in the case of a white thin character or a black character in gray background or a white character in black background, such an undesirable phenomenon is prevented that since difference in density between the character and its background is small, the thin line forming the character is broken. Accordingly, binary encoding of the image can be performed clearly in accordance with the image and stably.

In the above embodiment, the binary image processing apparatus 101 based on the image signal from the reading sensor 107 for the original document 102 has been described. However, the present invention can also be widely applied to a binary image processing apparatus based on video signals. Furthermore, binary encoding in the image processing circuit 109 may be performed by hardware such as an electric circuit in place of programming in the microcomputer or the like, thus resulting in rise of processing speed.

In accordance with the first embodiment of the present invention, in the first level discriminating means for performing level discrimination in binary encoding, the discrimination level is set at the average value of the density levels of the image signals of the pixels adjoining the target pixel for binary encoding when the differential value of the inputted image signal exceeds the predetermined discrimination level. Therefore, even if the image of the original document has small difference in density between a character and its background, for example, a white thin character, a black character in gray background or a white character in black background, the peripheral portion of the character can be detected clearly and stably for binary encoding. Consequently, performance of the binary image processing apparatus is improved and thus, quality of obtained image data is upgraded.

Figure 11:
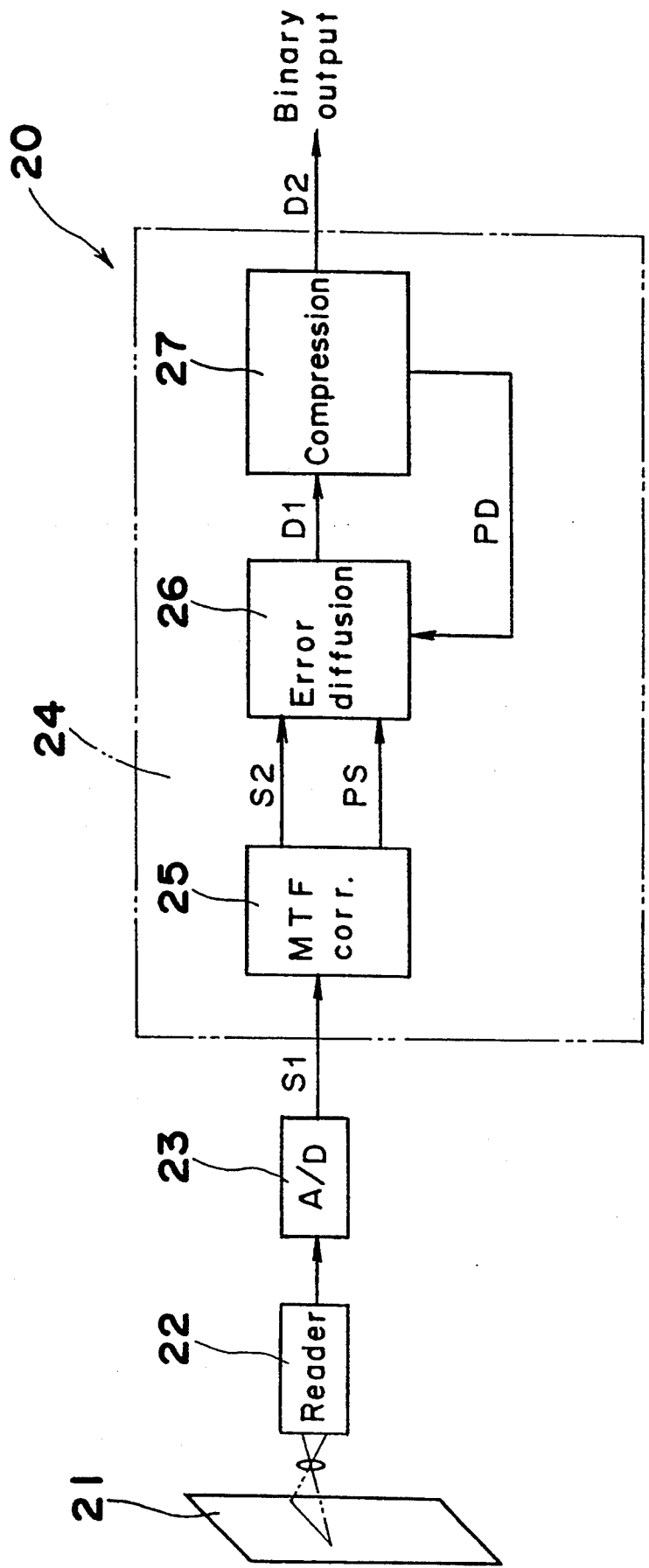
FIG. 11 is a schematic block diagram of a binary image processing apparatus according to a second embodiment of the present invention.

FIG. 11 shows a binary image processing apparatus 20 according to a second embodiment of the present invention. An image of an original document 21 is sequentially scanned for reading by a reading means 22 formed by a CCD or the like. An analog image signal outputted from the reading means 22 is supplied to an analog-digital converter 23 in which the analog image signal is converted into a digital image signal S1. This digital image signal S1 corresponds to, for example, 8-bit data. Density of each read pixel is indicated by the digital image signal S1 having 256 ($=2^8$) gradations of 0–255.

The gradation data S1 outputted by the analog-digital converter 23 is applied to an image processing circuit 24. The image processing circuit 24 is constituted by an MTF (modulation transfer function) correcting means 25, an error diffusing circuit 26 and a compression circuit 27. As described later, in order to improve contrast of the first gradation data S1 acting as the first image signal, the MTF correcting circuit 25 performs MTF correction of the first gradation data S1 into a second image signal S2 and supplies the second image signal S2 to the error diffusing circuit 26. Furthermore, the MTF correcting circuit 26 supplies to the error diffusing circuit 26, first gradation data PS of pixels disposed adjacent to the pixel corresponding to the second gradation data S2.

In the error diffusing circuit 26, data processing based on error diffusing method to be described later is performed. Namely, after the second gradation data S2 has been corrected from the outputs S2 and PS from the MTF correcting circuit 25 and first binary data PD of the pixels disposed adjacent to the pixel corresponding to the second gradation data S2 such that as deviation between a gradation level indicated by the second gradation data S2 and a threshold level Sh for performing binary encoding becomes larger, the deviations of the pixels disposed adjacent to the pixel having the large deviation are reduced, level discrimination is performed. Thus, the error diffusing circuit 26 supplies first binary data D1 of the first gradation data S1 to the compression circuit 27.

The compression circuit 27 performs compression processing to be described later, in which a plurality of the binary data D1 yielded for respective inputted pixels of two scanning lines are compressed into a plurality of binary data D2 corresponding to one scanning line and the binary data D2 are outputted. Furthermore, the compression circuit 27 supplies to the error diffusing circuit 26, the first binary data PD of the pixels disposed adjacent to the pixel corresponding to the second binary data D2.

Figure 12:
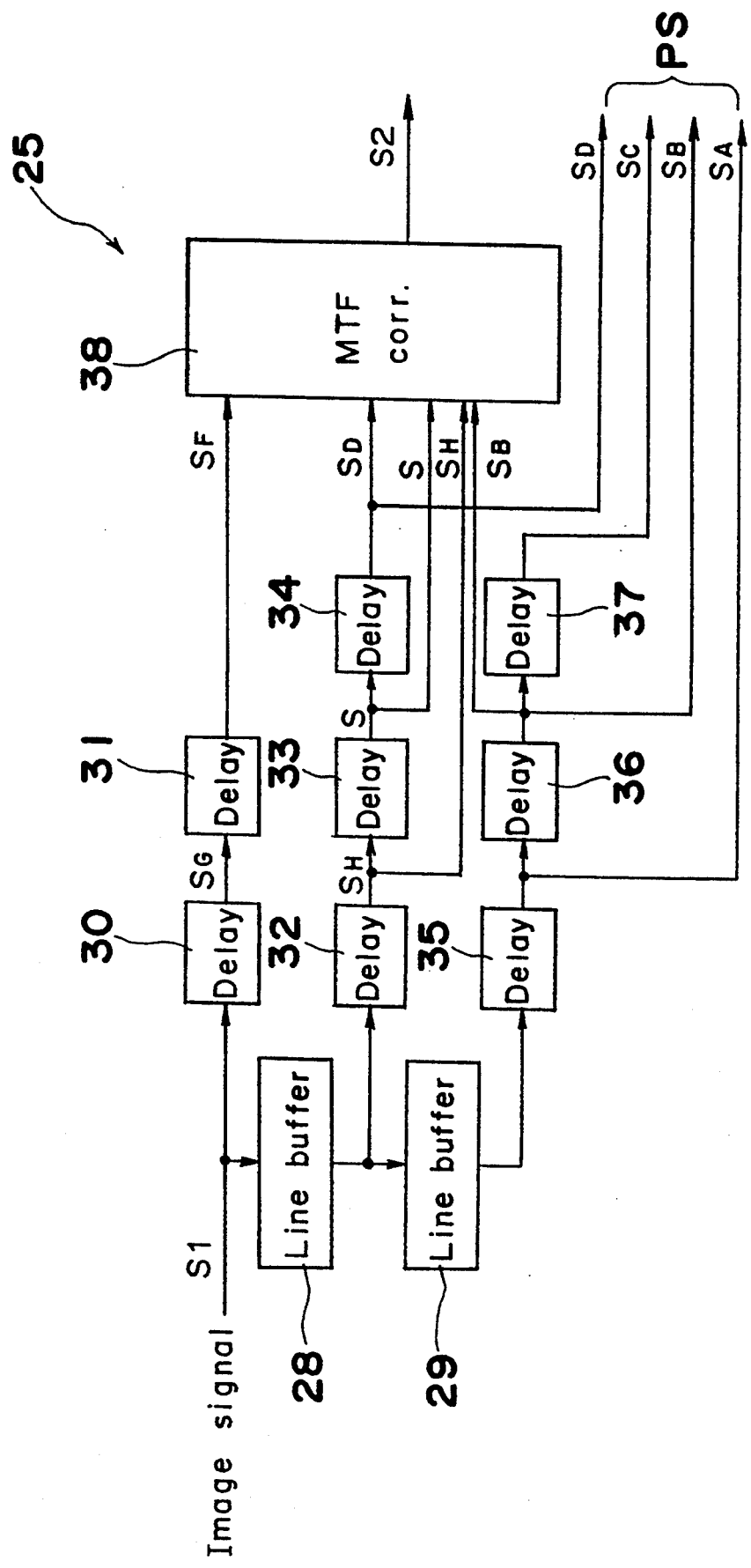
FIG. 12 is a block diagram of an MTF correcting means employed in the binary image processing apparatus of FIG. 11.
Figure 13:
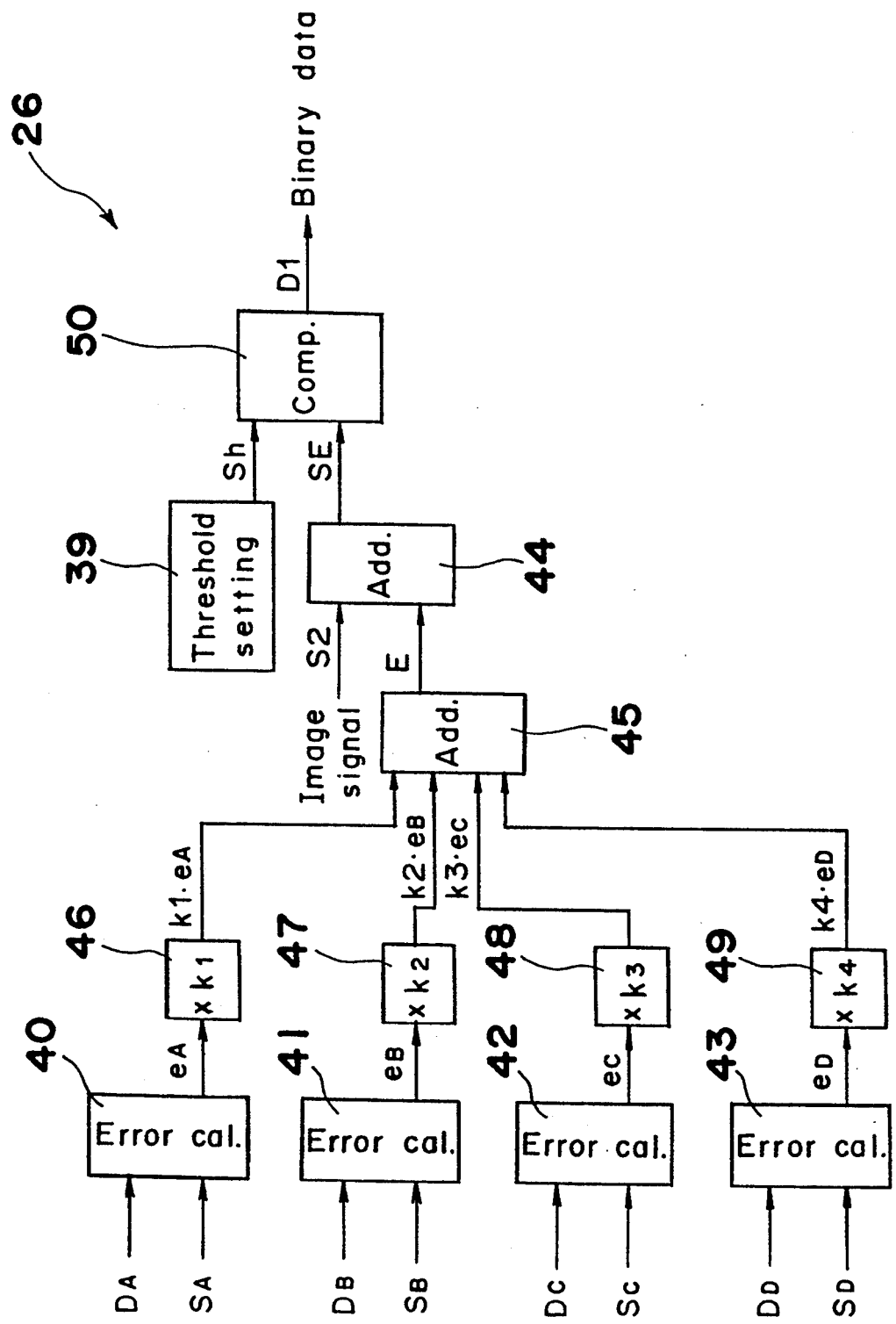
FIG. 13 is a block diagram of an error diffusing circuit employed in the binary image processing apparatus of FIG. 11.
Figure 14:
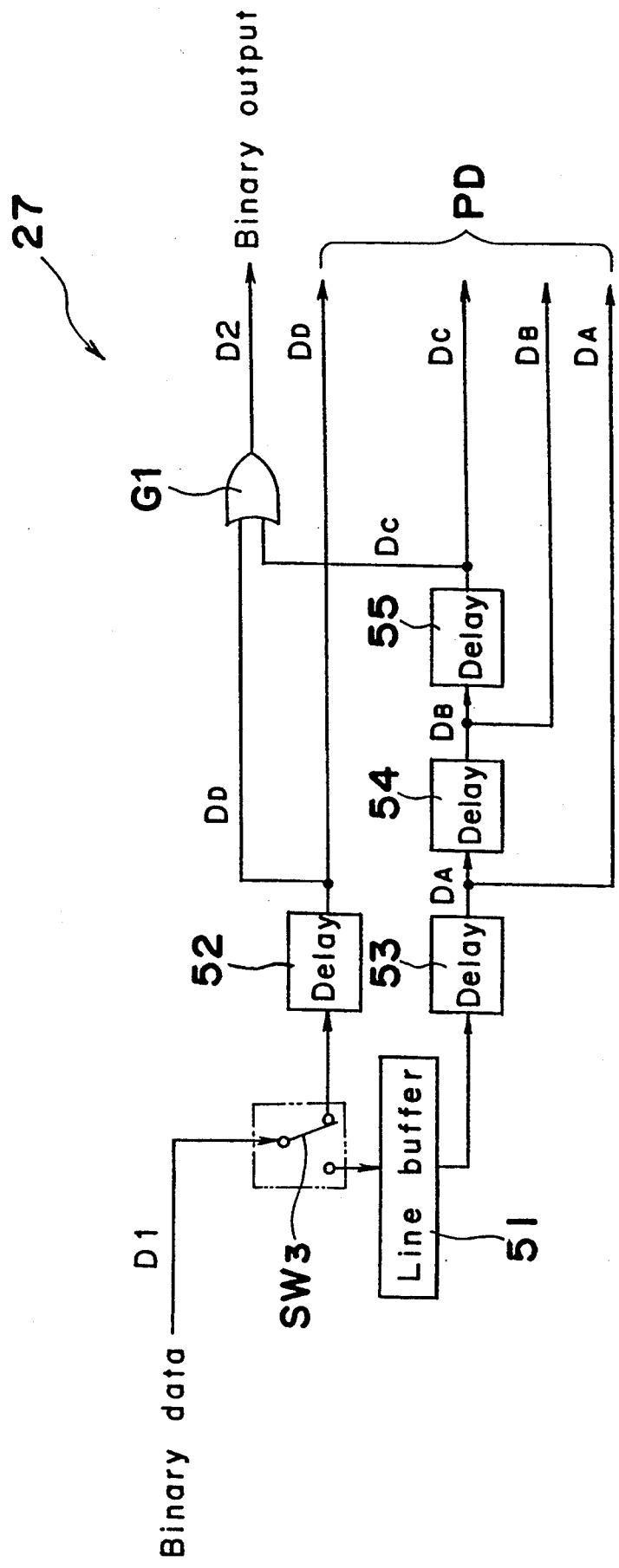
FIG. 14 is a block diagram of a compression circuit employed in the binary image processing apparatus of FIG. 11.
Figures 15A, 15B, 15C:
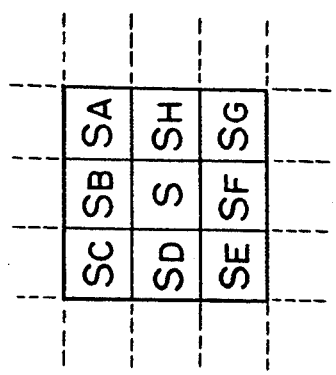
FIGS. 15(a) to 15(c) are views showing first gradation data, first binary data and errors of a target pixel and its peripheral pixels in the binary image processing apparatus of FIG. 11, respectively.

FIG. 12 shows a basic configuration of the MTF correcting means 25 and FIG. 13 shows a basic configuration of the error diffusing circuit 26. Meanwhile, FIG. 14 shows a basic configuration of the compression circuit 27. FIGS. 15(a), 15(b) and 15(c) show the first gradation data S of the target pixel for binary encoding and first gradation data SA to SH of the pixels adjoining the target pixel, first binary data D of the target pixel and first binary data DA to DH of the pixels adjoining the target pixel and an error e of the target pixel and errors eA to eH of the pixels adjoining the target pixel, respectively.

In the MTF correcting means 25 of FIG. 12, the first gradation data S1 which is the first image signal after analog-digital conversion is supplied to a line buffer memory 28 in which the gradation data S1 for each pixel of one scanning line is temporarily stored. Furthermore, the gradation data S1 is applied, through delay circuits 30 and 31 for effecting delay of one pixel, to an MTF correcting circuit 38. The first gradation data which has been subjected to delay of one scanning line by the line buffer memory 28 is not only supplied to a subsequent line buffer memory 29 so as to be temporarily stored in the line buffer memory 29 but applied, via delay circuits 32, 33 and 34, to the MTF correcting circuit 38. The first gradation data S1 which has been further subjected to delay of one scanning line by the line buffer memory 29 is outputted as first gradation data SC by way of delay circuits 35, 36 and 37.

Since the delay circuits 32 to 37 yield an output signal obtained by imparting delay of one pixel to an input signal, the first gradation data SH and S shown in FIG. 15(a) are supplied from the delay circuits 32 and 33 to the MTF correcting circuit 38, respectively. Likewise, the first gradation data SA and SB are, respectively, supplied from the delay circuits 35 and 36 to the MTF correcting circuit 38. Meanwhile, the first gradation data SF is supplied from the delay circuit 31 to the MTF correcting circuit 38.

Based on these inputted first gradation data S, SB, SD, SF and SH, the MTF correcting circuit 38 performs MTF correction for improving contrast of the pixel corresponding to the first gradation pixel S and outputs second gradation data S2 acting as a second image signal. Namely, in the MTF correcting circuit 38, mean gradation data Smean is calculated by the following equation (8) from the first gradation data SB and SF of the pixels adjoining vertically the target pixel for binary encoding and the first gradation data SD and SH of the pixels adjoining laterally the target pixel.

$$Smean=(SB+SD+SF+SH)/4 \qquad (8)$$

Subsequently, by using constants A and B having a relation: $A-B=1$, the second gradation data S2 is calculated by the following equation (9).

$$S2=A\times S-B\times Smean \qquad (9)$$

Contrast of the second gradation data S2 which has been calculated and outputted by the MTF correcting circuit 38 is improved as compared with that of the first gradation data S1 obtained initially from the corresponding pixel.

As shown in FIG. 13, the first gradation data SA, SB, SC and SD outputted from the MTF correcting means 25 are, respectively, supplied to error calculating circuits 40, 41, 42 and 43 of the error diffusing circuit 26. Meanwhile, the second gradation data S2 from the MTF correcting means 25 is applied to an adder 44. The first binary data DA, DB, DC and DD of the pixels corresponding to the first gradation data SA, SB, SC and SD are supplied from the compression circuit 27 of FIG. 14 to the error calculating circuits 40, 41, 42 and 43, respectively.

Based on the first gradation data SA and the first binary data DA inputted to the error calculating circuit 40, the error calculating circuit 40 calculates an error eA for implementing error diffusing method to be described later and outputs the error eA to a multiplier 46. Similarly, based on the gradation data SB, SC and SD and the first binary data DB, DC and DD inputted to the error calculating circuit 41, 42 and 43, the error calculating circuits 41, 42 and 43 calculate errors eB, eC and eD and output the errors eB, eC and eD to multipliers 47, 48 and 49, respectively. Products of k1·eA, k2·eB, k3·eC and k4·eD from the multipliers 46 to 49 are added to each other by an adder 44 so as to be outputted as a sum E from the adder 45 to an adder 44, namely E=k1·eA+k2·eB+k3·eC+k4·eD. The adder 44 adds the sum E to the second gradation data S2 so as to output a sum SE to a comparator 50, namely SE-=E+S2. The comparator 50 performs level discrimination of the output SE of the adder 44 by using a predetermined threshold value Sh of a threshold setting circuit 39 as a discrimination level and outputs first binary data D1 of the pixel corresponding to the second gradation data S2.

Referring to FIG. 14 showing the compression circuit 27, the first binary data D1 outputted from the error diffusing circuit 26 is initially supplied, through a changeover switch SW3, to a line buffer memory 51 in which a plurality of the first binary data D1 corresponding to one scanning line are temporarily stored. The line buffer memory 51 has a storage capacity which is by two pixels less than the number of the pixels corresponding to one scanning line. The first binary data D1 stored in the line buffer memory 51 are supplied, by way of delay circuits 53, 54 and 55, to an OR gate G1. When the first binary data D1 corresponding to one scanning line have been stored in the line buffer memory 51, the changeover switch SW3 is changed over such that the first binary data D1 are applied to a delay circuit 52. An output from the delay circuit 52 is supplied to the OR gate G1.

The delay circuits 52, 53, 54 and 55 are adapted to output data subjected to delay of one pixel. Therefore, when the first binary data D1 supplied from the error diffusing circuit 26 to the compression circuit 27 is the binary data D shown in FIG. 15(b), the output from the delay circuit 52 is the binary data DD and the output from the delay circuit 55 is the binary data DC. Meanwhile, the binary data DA and DB are outputted from the delay circuits 53 and 54. The binary data DC and DD from the delay circuits 55 and 52 are outputted, through the OR gate G1, as second binary data D2 of the pixels corresponding to the binary data DC and DD. Meanwhile, the first binary data DA to DD outputted from the delay circuits 52 to 55 are supplied to the error calculating circuits 40 to 43 of the error diffusing circuit 26, respectively.

Hereinbelow, error diffusion method is described with reference to FIGS. 12 to 15. After the second gradation data S2 of the target pixel has been subjected to MTF correction, the error data E of the pixels disposed adjacent to the target pixel are added to the second gradation data S2 such that the sum SE is obtained. The sum SE is subjected to binary discrimination by using the predetermined threshold value Sh as the discrimination level, so that the first binary data D1 is obtained as follows.

$$SE = S + E \qquad (10)$$
$$= S + k1 \cdot eA + k2 \cdot eB + k3 \cdot eC + k4 \cdot eD$$

In the above equation (10), the error ei (i=A, B, C, D) is calculated in the error calculating circuits 40 to 43 by the following equation (11):

$$ei = \begin{cases} Si & (Di = \text{"1"}) \\ Si - R & (Di = \text{"0"}) \end{cases} \qquad (11)$$

where
i = A, B, C, D and
R = constant.

In the above equation (11), the first binary data Di is set in the comparator 50 by the following equation (12).

$$Di = \begin{cases} \text{"1"} & (SE < Sh) \\ \text{"0"} & (SE \geq Sh) \end{cases} \qquad (12)$$

The first gradation data Si in the above equation (11) is the gradation data of the pixel i (i=A, B, C, D) and assumes a value of 0 to $(2^r-1)$ in the case of, for example, r-bit data. Meanwhile, the constant R of the equation (11) is set at a value obtained by adding 1 to the maximum of Si, i.e. $2^r$. Meanwhile, the above mentioned k1 to k4 are weighting factors by which the errors eA to eD are multiplied in the multipliers 46 to 49, respectively and are set by the following equation (13).

$$\left. \begin{array}{l} 0 < k1, k2, k3, k4 < 1 \\ k1 + k2 + k3 + k4 = 1 \end{array} \right\} \qquad (13)$$

For example, k1=k2=k3=k4=¼. In another case, k1=3/16, k2=5/16, k3=1/16, k4=7/16. The values of the weighting factors k1 to k4 are properly set so as to obtain desirable results of binary image processing.

For example, supposing that the number r of bits of the gradation data is 8, the first gradation S1 assumes a value of 0–255. As this value of the first gradation data S1 becomes larger and smaller, the pixel assumes white color and black color more and more, respectively.

If the minimum and the maximum of the first gradation data S1 are, respectively, set at 0 corresponding to the black pixel and 255 corresponding to the white pixel in order to simplify error calculation, binary encoding of the first gradation data S1 into the binary data D1 corresponds to judgement in which the value of the first gradation data S1 is regarded as 0 of the black pixel or 255 of the white pixel. Thus, this judgement produces errors.

Namely, when the gradation data S is 200 in decimal notation, judgement of the pixel as the white pixel, i.e. the gradation data S=255 deviates from the actual value of 200 towards the white pixel by the difference of 55. On the other hand, when the gradation data S is 100 in decimal notation, judgement of the pixel as the black pixel, i.e. the gradation data S=0 deviates from the actual value of 100 towards the black pixel by the difference of 100.

Therefore, in error diffusing method, the above described errors produced in binary judgement are taken into account at the next binary judgement in which the predetermined weighting factors k1 to k4 are incorporated into the above described errors produced in the pixels disposed adjacent to the target pixel.

If the number r of bits of the gradation data is 8, the above described constant R assumes 256 $(=2^r)$. If Judgement of Di=0, i.e. judgement of the pixel as the white pixel is made by the predetermined threshold value Sh of the threshold setting circuit 39 when the first gradation data S1 assumes 85 (=01010101(2)), the error ei is determined by the equation (11) as follows.

ei=Si−R=85−256=−171=10101011(2)

Meanwhile, judgement of Di=1, i.e. judgement of the pixel as the black pixel is made when the first gradation data S1 assumes 85 (=01010101(2)), the error ei is determined by the equation (11) as follows.

ei=Si=85=01010101(2)

In the above described error ei in binary notation, the most significant bit (MSB) of 0 and 1 represents positive value and negative value in decimal notation.

Figure 16:
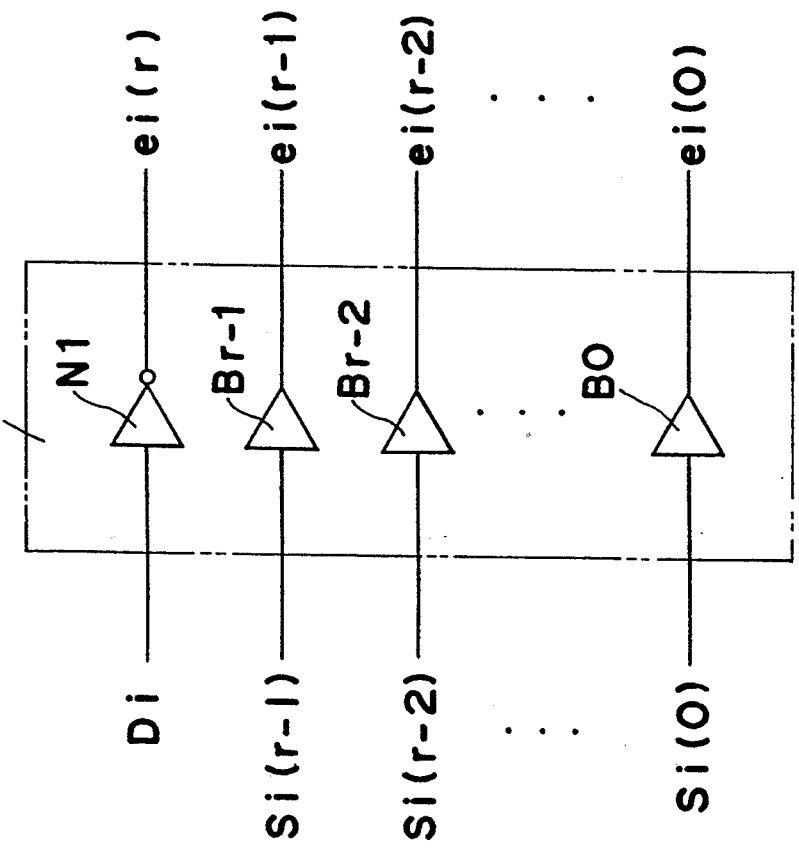
FIG. 16 is a block diagram showing an arrangement of error calculating circuits employed in the error diffusing circuit of FIG. 13.

The error calculating circuits 40 to 46 for performing error calculation by the equation (11) are obtained by a simple arrangement of FIG. 16. In FIG. 16, Si(r−1), Si(r−2), - - -, Si(0) denote signals of the bits of the first gradation data Si from the most significant bit (MSB) to the least significant bit (LSB), respectively. Meanwhile, ei(r), ei(r−1), - - -, ei(0) represent the error ei of the bits from the MSB to the LSB, respectively.

The first binary data Di is outputted as the error signal ei(r) through an inversion buffer N1. Meanwhile, the first gradation data Si(r−1) to Si(0) are outputted as the error signals ei(r−1) to ei(0) through buffers $B_{r-1}$, $B_{r-2}$, - - -, $B_0$, respectively.

Figure 1:
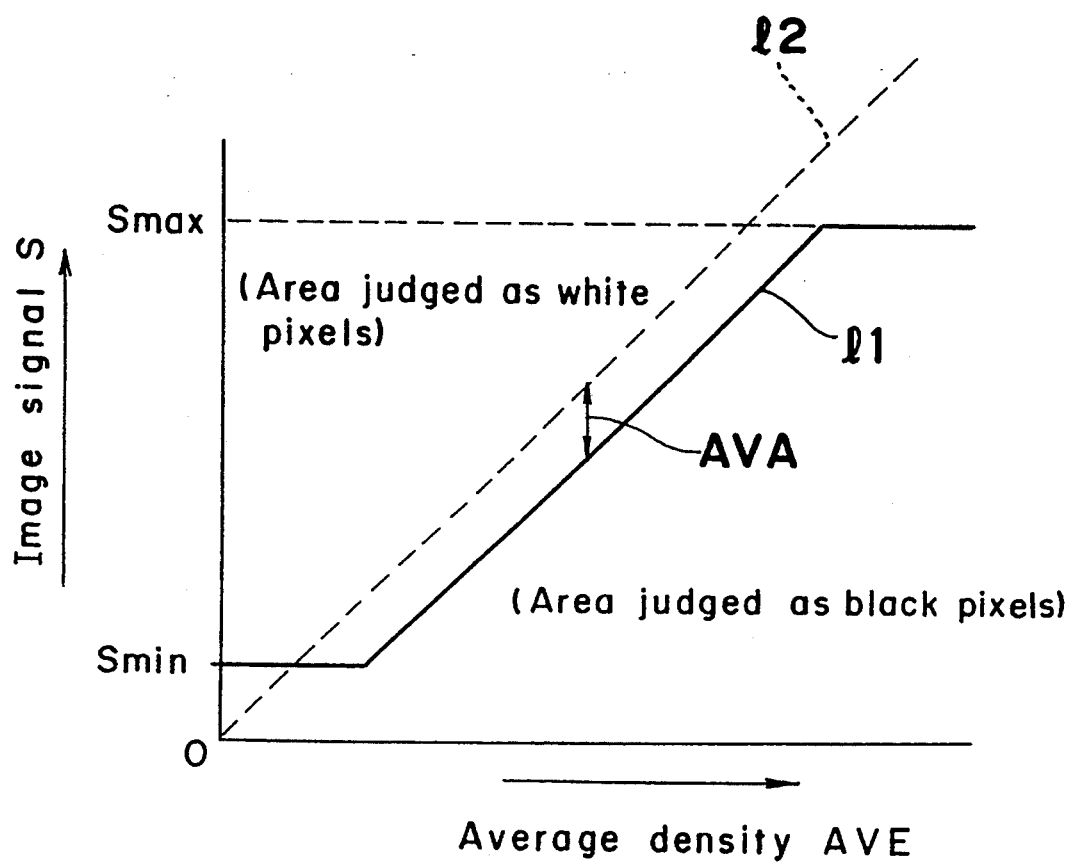
FIG. 1 is a graph showing binary discrimination regions in prior art average density slice method (already referred to)
Figure 2A:
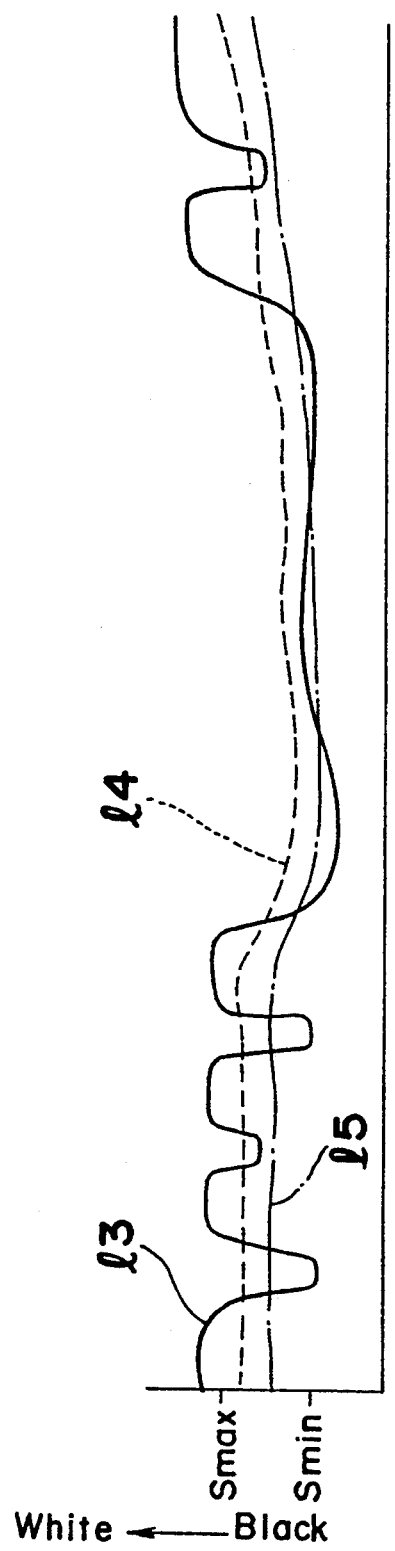
FIGS. 2(a) to 2(c) are graphs showing results of binary encoding in the prior art average density slice method of FIG. 1 (already referred to)
Figure 2B:
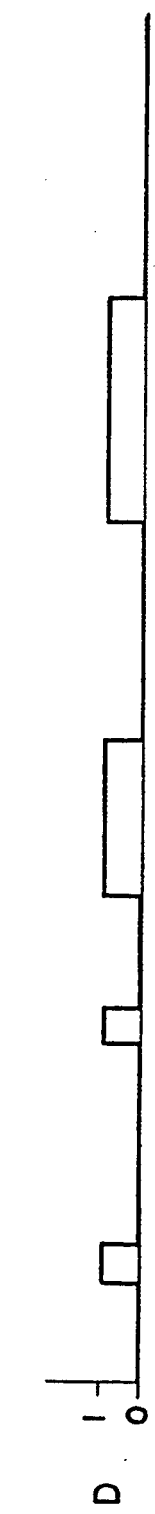
Figure 2C:
Figure 3:
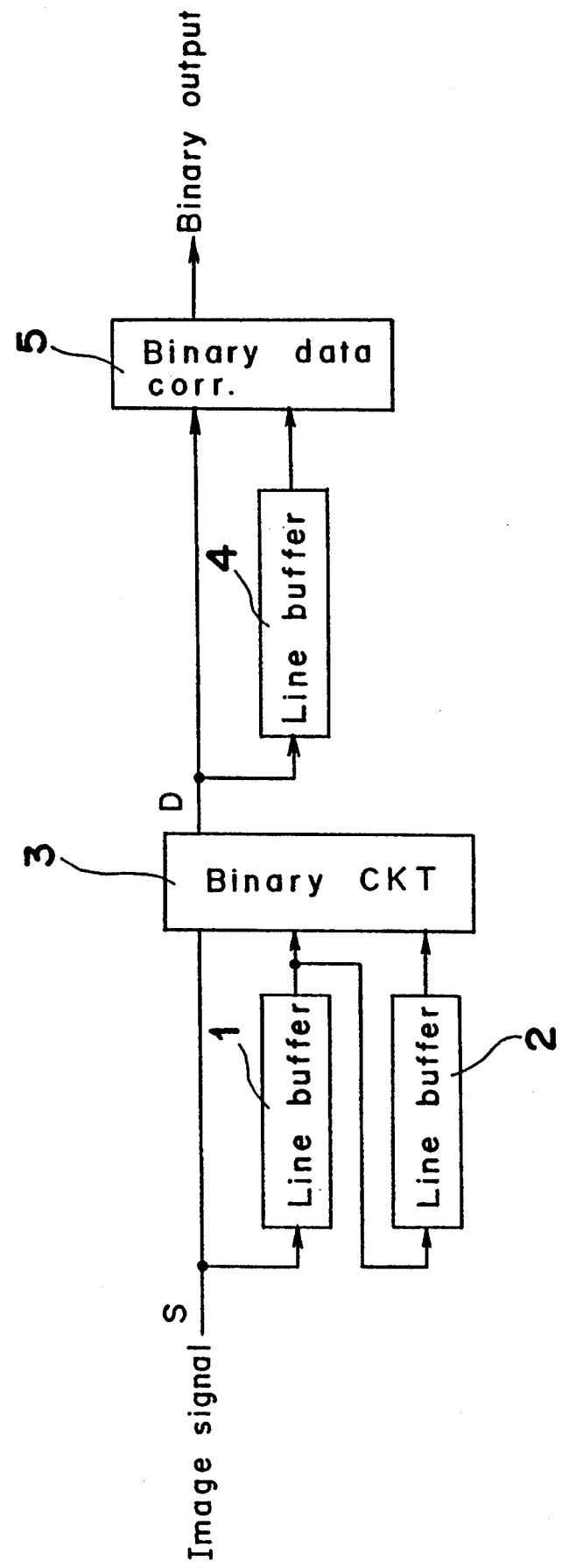
FIG. 3 is a block diagram of a prior art binary image processing apparatus (already referred to)
Figure 4:
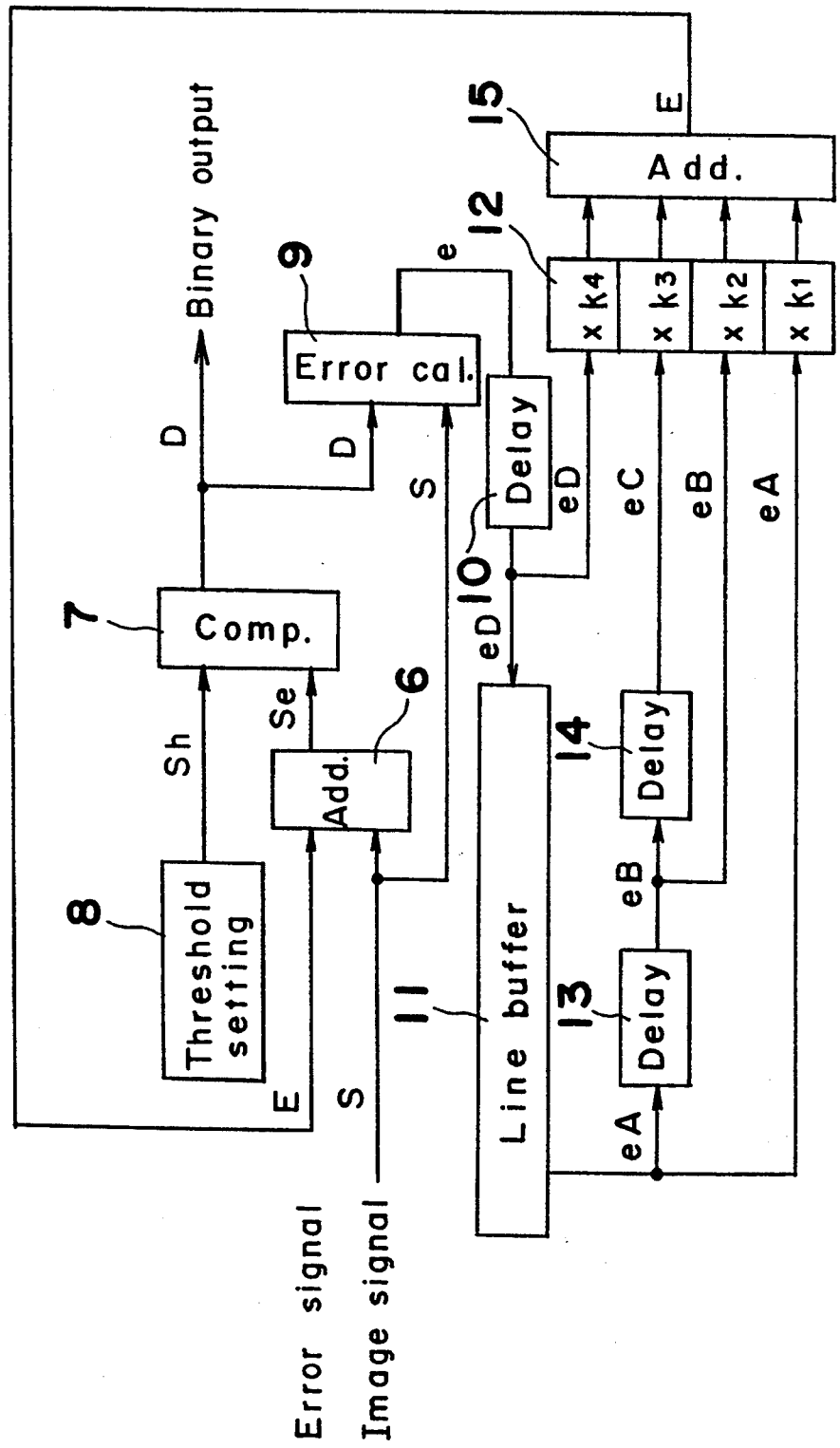
FIG. 4 is a block diagram of a prior art circuit for implementing error diffusion method (already referred to)

As described above, in the second embodiment, the error calculating circuits 40 to 43 of the error diffusing circuit 26 are obtained by the simple arrangement as shown in FIG. 16. Meanwhile, the first gradation data SA to SD and the first binary data DA to DD which are required for calculating the errors eA to eD are supplied to the error calculating circuits 40 to 43 from the MTF correcting means 25 and the compression circuit 27 of the binary image processing apparatus 20 such that the second binary data D2 acting as the final binary output is produced from the inputted first image data S1. Therefore, in the second embodiment, the error ei (i=A, B, C, D) is not required to be stored in the line buffer memory 11 of prior art error calculation of FIG. 4 referred to earlier, so that the line buffer memory 11 can be eliminated and thus, production cost of the binary image processing apparatus 20 can be reduced.

In the second embodiment, the first gradation data SA to SD and the first binary data DA to DD are, respectively, outputted from the MTF correcting means 25 and the compression circuit 27 to the error diffusing circuit 26. However, the present invention is not restricted to this method. For example, it can also be so arranged that a buffer memory such as a smoothing circuit for removing unevenness of each pixel is provided such that the first binary data DA to DD outputted from the buffer memory are utilized.

Furthermore, in the second embodiment, the error E calculated in error diffusing method is obtained as the sum of the weighted errors of the four pixels disposed adjacent to the target pixel. However, the error E may also be calculated by expanding the area for error calculation more than the above described four pixels.

In accordance with the second embodiment of the present invention, in the binary image processing apparatus provided with the image signal correcting means and the data compressing means, the error diffusing means corrects, in response to the first image signal from the image signal correcting means and the first binary data from the data compressing means, the second image signal so as to perform level discrimination of the corrected second image signal such that error diffusing method is implemented. Consequently, the number of the components such as the storage means and the delay means is reduced and the circuit configuration is simplified, thereby resulting in reduction of production cost of the binary image processing apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A binary image processing apparatus comprising:
an image signal generating means for sequentially generating a first image signal indicative of density of a target pixel;
an electrical image signal correcting circuit which outputs, in response to the first image signal from said image signal generating means, a second image signal obtained by subjecting the first image signal to correction for improving contrast of the first image signal and for outputting a further first image signal of pixels disposed adjacent to the target pixel;
an error diffusing circuit responsive to the second image signal and the further first image signal from said electrical image signal correcting circuit and also responsive to further first binary data of the pixel disposed adjacent to the target pixel, for correcting the second image signal so as to further reduce the variation of the pixel disposed adjacent to the target pixel when the variation between the level of the second image signal exceeds a predetermined discrimination level and for then determining the level of the second image signal so as to output first binary data relating to the first image signal; and
a data compressing circuit which compresses the first binary data from said error diffusing circuit so as to not only output second binary data of the first image signal but also supply the further first binary data to said error diffusing circuit.

2. A binary image processing apparatus as claimed in claim 1, wherein said electrical image signal correcting circuit includes an MTF (modulation transfer function) correcting circuit responsive to said first image signal for producing said second image signal and said further first image signal.

3. A binary image processing apparatus as in claim 1 wherein said image signal generating means includes an analog to digital converter for generating said first image signal.

4. A binary image processing apparatus as in claim 1 wherein said image signal generating means includes mean for sequentially scanning a document on a line-by-line basis and for sequentially generating a plurality of said first image signals, and
said data compression circuit includes line buffer and switching means for compressing said first binary data corresponding to two lines of said first image signals into one scanning line of said second binary data.

5. A binary image processing apparatus as in claim 1 wherein said error diffusing circuit further includes error calculating circuits responsive to said further first image signal and said further first binary data for calculating error data of the pixels adjacent to said target pixel for use in correcting said second image signal, whereby said second binary data is produced without requiring a buffer memory for storing said error data.

* * * * *